(12) United States Patent
Bennington et al.

(10) Patent No.: US 9,093,184 B2
(45) Date of Patent: Jul. 28, 2015

(54) SPACECRAFT SHIELD

(71) Applicant: CELLA ENERGY ACQUISITION LIMITED, Didcot, Oxfordshire (GB)

(72) Inventors: Stephen Bennington, Abingdon (GB); Arthur Lovell, Oxford (GB); Tom Headen, Wantage (GB); David Royse, Reading (GB); Atahl Nathanson, Oxford (GB); Stephen Voller, Hampshire (GB); Gang Liu, Merritt Island, FL (US); Stephen Perusich, Merritt Island, FL (US); Sean McGrady, Cocoa Beach, FL (US)

(73) Assignee: Cella Acquisition Limited, Didcot (GB)

( * ) Notice: Subject to any disclaimer, the term of this patent is extended or adjusted under 35 U.S.C. 154(b) by 0 days.

(21) Appl. No.: 14/352,244

(22) PCT Filed: Oct. 17, 2012

(86) PCT No.: PCT/IB2012/002801
§ 371 (c)(1),
(2) Date: Apr. 16, 2014

(87) PCT Pub. No.: WO2013/057588
PCT Pub. Date: Apr. 25, 2013

(65) Prior Publication Data
US 2014/0299794 A1    Oct. 9, 2014

Related U.S. Application Data

(63) Continuation of application No. 13/274,871, filed on Oct. 17, 2011, now abandoned.

(30) Foreign Application Priority Data

Oct. 17, 2011   (GB) .................................. 1117872.0

(51) Int. Cl.
*G21F 1/10* (2006.01)
*B29C 39/02* (2006.01)
(Continued)

(52) U.S. Cl.
CPC ................ *G21F 1/103* (2013.01); *B29C 39/02* (2013.01); *B29C 43/02* (2013.01);
(Continued)

(58) Field of Classification Search
CPC ...................................... G21F 1/00; G21F 3/00
USPC ..................... 250/506.1, 515.1, 518.1, 519.1; 252/478; 106/717
See application file for complete search history.

(56) References Cited

U.S. PATENT DOCUMENTS 4,123,392 A  * 10/1978 Hall et al. ..................... 252/478
4,303,553 A  * 12/1981 Aoki et al. .................... 252/478
(Continued)

FOREIGN PATENT DOCUMENTS

CN        102030938 A     4/2011
GB        1200614         7/1970
(Continued)

OTHER PUBLICATIONS

A. F. Barghouty et al., "The Exploration Atmospheres Working Group's Report on Space Radiation Shielding Materials", NASA/TM-2006-214604, Sep. 2006, 27 pages.
(Continued)

*Primary Examiner* — David A Vanore
(74) *Attorney, Agent, or Firm* — Birch, Stewart, Kolasch & Birch, LLP

(57) ABSTRACT

A spacecraft and spacesuit having a radiation shield are disclosed. The shield comprises a hydrogen-containing material encapsulated or bound in a polymer. The hydrogen-containing material has a higher hydrogen content than polyethylene. The hydrogen-containing material may be: encapsulated in a polymer container, sandwiched between layers of polymer, mixed with a polymer as binder, or held in the pores of a polymer foam. The hydrogen may be a hydride or borohydride such as beryllium borohydride, ammonium octahydrotriborate, lithium borohydride tetramethyl ammonium borohydride and beryllium hydride. Methods of manufacturing the shield are also disclosed.

17 Claims, 15 Drawing Sheets

(51) Int. Cl.

| | | |
|---|---|---|
| B29C 43/02 | (2006.01) | |
| B29C 67/04 | (2006.01) | |
| D01D 5/00 | (2006.01) | |
| G21F 3/025 | (2006.01) | |
| B29C 47/00 | (2006.01) | |
| D01F 1/10 | (2006.01) | |
| D01F 8/04 | (2006.01) | |
| G21F 3/00 | (2006.01) | |

(52) U.S. Cl.
CPC ........ *B29C 47/0014* (2013.01); *B29C 47/0021* (2013.01); *B29C 67/04* (2013.01); *D01D 5/0007* (2013.01); *D01F 1/10* (2013.01); *D01F 8/04* (2013.01); *G21F 1/10* (2013.01); *G21F 3/00* (2013.01); *G21F 3/025* (2013.01); *Y10T 428/2495* (2015.01)

(56) References Cited

U.S. PATENT DOCUMENTS

| | | | |
|---|---|---|---|
| 4,437,013 A * | 3/1984 | Hondorp | 250/515.1 |
| 5,278,219 A | 1/1994 | Lilley et al. | |
| 5,416,333 A * | 5/1995 | Greenspan | 250/515.1 |
| 5,700,526 A * | 12/1997 | Ximen et al. | 427/527 |
| 5,814,824 A * | 9/1998 | Hamby et al. | 250/515.1 |
| 7,399,431 B2 * | 7/2008 | Abadie et al. | 252/478 |
| 7,494,937 B2 * | 2/2009 | Clark | 438/778 |
| 7,531,452 B2 * | 5/2009 | Clark | 438/656 |
| 2003/0168637 A1 | 9/2003 | McCord | |
| 2005/0258405 A1 | 11/2005 | Sayala | |
| 2006/0284122 A1 * | 12/2006 | Caldwell | 250/515.1 |
| 2008/0306184 A1 | 12/2008 | Harmon et al. | |
| 2010/0176317 A1 | 7/2010 | Smith | |
| 2013/0095307 A1 * | 4/2013 | Bennington et al. | 428/213 |

FOREIGN PATENT DOCUMENTS

| | | |
|---|---|---|
| GB | 1225111 | 3/1971 |
| RU | 2111558 C1 | 5/1998 |
| WO | WO 02/079302 A1 | 10/2002 |

OTHER PUBLICATIONS

J.H. Adams et al., "Revolutionary Concepts of Radiation Shielding for Human Exploration of Space", NASA/TM-2005-213688, Mar. 2005, 110 pages.

R. K. Tripathi et al., "Paper No. 01ICES-2326 Deep Space Mission Radiation Shielding Optimization", Age 25(35), 45, 2001, 14 pages.

Z. T. Ossefort et al., "Elastomers for Neutron Shielding", Proceedings of the Seventh Joint Army-Navy-Air Force Conference on Elastomer Research and Development, San Francisco, California, Oct. 22-24, 1962, vol. 1, 29 pages.

Townsend et al., "Shielding Effectiveness of Sodium Alanate and Ammonia Borane for Galactic Cosmic Ray and Solar Energetic Particle Event Environments", SAE Int. J. Aerosp., vol. 1, No. 1, 2008, pp. 522-525.

Wilson, et al., "Shielding Strategies for Human Space Exploration", NASA Conference Publication 3360, Dec. 1997, entire document, and particularly Abstract and Chapter 7—Radiation Shielding Design Issues at pp. 111-149 and p. 459.

* cited by examiner

SPACECRAFT SHIELD

CROSS REFERENCE TO RELATED APPLICATIONS

This application is the National Phase of PCT/IB2012/002801 filed on Oct. 17, 2012, which claims benefit from U.S. application Ser. No. 13/274,871 filed Oct. 17, 2011 (now Abandoned) and GB 1117872.0 filed on Oct. 17, 2011, all of which are hereby expressly incorporated by reference into the present application.

TECHNICAL FIELD

The present invention relates to space shielding and more particularly to shielding to reduce exposure to ionizing radiation in spacecraft, such as high energy electrons and protons but also heavy ions. The present invention also relates to reducing exposure through spacesuits and to methods of manufacturing spacecraft and spacesuit shields.

BACKGROUND ART

Terrestrial radiation comes largely from nuclear decay and the remnants of cosmic and solar radiation that has interacted with the atmosphere. This solar radiation is made up of light charged particles with energies of around 1 to 2 MeV.

Radiation in space is made up of particles having much higher energies. Space radiation can be divided into three types. Firstly, solar particles are ejected from the sun in solar flares. The magnitude of these varies according to the sun's 11-year solar magnetic cycle. The particles are electrons and protons with energies typically in the range of hundreds of MeV to low GeV. The protons cause the majority of the damage. Extreme events are known as solar proton events (SPE). Galactic cosmic rays (GCR) are a second type of space radiation. These consist of energetic particles from events in deep space. The particles are protons, helium nuclei, and small numbers of heavier nuclei such as carbon and iron. These particles often have very high energy, for example in the range 1 to 20 GeV. A third type of radiation is that trapped by the earth's magnetic field. This trapped radiation is formed by some of the flux of protons and electrons coming from the sun. They are concentrated into two radiation bands called the Van Allen belts. This radiation consists mostly of protons with energies up to 600 MeV.

In close earth orbit satellites benefit from the proximity of the earth and its magnetic field, but such satellites are outside the earth's atmosphere so they still receive significantly more radiation than on the surface of the earth. On earth space radiation produces an average dose of 0.4 mSv/year, whereas on the International Space Station this rises to 150 mSv/year. Deep space missions would subject humans to even greater doses, perhaps as high as 900 mSv/year.

Different orbits can have significantly different radiation environments. Satellites in a low earth orbit will have the lowest dose particularly those in an equatorial or low inclination orbit. Under normal circumstances radiation is unlikely to be life-limiting. Satellites in equatorial geostationary orbits are much further from the earth and will have a higher dose. But they still have a good chance of surviving for 10 years, which is typically the same as the lifetime of a communications satellite before it runs out of propellant.

Highly inclined or polar orbits that are used for earth observation satellites come into contact with the Van Allen radiation belts at the poles and at the South Atlantic Anomaly. The radiation damage on the electronics of these satellites is much higher and their life expectancy is correspondingly lower.

Communications satellites that are designed for use at high latitudes use a highly elliptical orbit called a Molniya orbit which takes them into regions of very high radiation and these satellites are unlikely to last longer than 7 years.

Lastly spacecraft that are designed to operate in deep space such as those used for monitoring solar weather or for exploration will encounter very high levels of radiation.

The amount of radiation that a satellite receives can vary dramatically during the sun's 11 year cycle, and can experience very high doses during extreme solar weather events. Some events irradiate to such an extent that the average power-draw can increase several percent in a few hours due to changes to semiconducting and dielectric properties.

Materials and electronics can be damaged by space radiation in several ways. Heavy ions, neutrons and protons can displace atoms in a semiconductor, introducing noise and error sources. The characteristics of capacitor dielectrics, metal resistor films, other passive electronic components and even wiring and cabling can be degraded by radiation over time.

It is also possible for high energy charged particles to alter the bits stored in computer memory. These are called single event upsets and can cause anything from a short-term denial of service to the loss of the satellite.

Most of the energy lost by an incoming particle in matter is through the interaction with electrons. So for space applications materials with the highest number of electrons per unit mass are best. However, very high energy irradiation can cause nuclear fragmentation in heavier elements such as aluminium, which can increase the absorbed dose for electronics or biological tissue behind the shield. In contrast, nuclear collisions become a significant cause of radiation particle energy loss when the materials contain a large fraction of light elements such as hydrogen. Unlike heavier elements, the nucleus of the hydrogen atom cannot fragment and instead slows the incoming ions through inelastic collisions. Thus a high hydrogen content shield material operates by absorbing or moderating the energy of the incoming particles.

For space applications weight is the critical factor and so the effectiveness of a radiation shielding material is measured by its ability to reduce the dose for the minimum weight, and the usual method for judging efficacy is a materials dose reduction versus its areal density ($gm/cm^2$).

For this reason lightweight, hydrogenous materials such as polyethylene are preferred. Lead, on the other hand, is less efficient at absorbing energy per unit mass and is more suited to terrestrial situations where volume not mass is more important.

Polyethylene is 14.4% hydrogen by weight. Thus a key parameter in the choice of new materials is whether it has a hydrogen content greater than polyethylene.

SUMMARY OF THE INVENTION

The present invention provides a spacecraft having a radiation shield. The shield preferably comprises a material with a hydrogen content higher than that of polyethylene. The shield also comprises a polymer that either acts as containment or a binder to enable the construction of a material with reasonable structural properties. There may be reasons to further wrap the material in a gas- or vapour-impermeable barrier, for example if:
1) The shield material is sensitive to oxygen or moisture;
2) The polymer or hydride material outgas significantly when heated in a vacuum;

3) The material is to be used on the outside of a spacecraft where oxygen ion erosion could damage the material.

There is a small additional benefit in using materials which also contain a neutron-absorbing element such as boron or lithium. Space radiation does not typically have a significant neutron flux. However, the secondary radiation that is caused when the high energy protons and heavy ions interact with the metal of a spacecraft does contain high energy neutrons which are damaging.

The preferred criteria we have used to select suitable high hydrogen content materials are:
1) Materials with hydrogen contents that are significantly higher than polyethylene which is currently used in the International Space Station (i.e. greater than 14.4 wt. %)
2) Materials that are stable and do not melt or release hydrogen at temperatures below 100° C. or 120° C.

These are preferences and the present invention is not to be limited to materials meeting these criteria.

Surprisingly few compounds and materials fulfil all of these criteria and those that do are listed these in Table 1. Some are still relatively unstable and others highly toxic which will preclude them for use in some shielding applications.

TABLE 1

| Compound | Formula | Hydrogen Content | Stability |
|---|---|---|---|
| Beryllium borohydride | $Be(BH_4)_2$ | 20.84% | Releases hydrogen at 123° C. |
| Ammonium octahydrotriborate | $NH_4B_3H_8$ | 20.53% | Melts around 120° C. |
| Lithium borohydride | $Li(BH_4)$ | 18.51 wt % | Stable up to 275° C. Reacts with moisture and oxygen |
| Tetramethyl ammonium borohydride | $(CH_3)_4NBH_4$ | 18.12 wt. % | Melts at 300° C. |
| Beryllium Hydride | $BeH_2$ | 18.28 wt. % | Releases hydrogen at 250° C. |

Other examples of shield materials are set out herein.

Most of the materials have low structural performance and many are air- or at least moisture-sensitive. For this reason it is preferable to combine them with other materials to strengthen and/or protect them from decomposition. Given the need for the materials to be lightweight, polymers are the obvious choice, particularly those with high hydrogen contents of their own. The polymer can either be used to form a matrix through which the absorber is distributed or to make a container within which the absorber is held.

A further barrier layer may then be added to stop gases from getting in or out, for example oxygen or moisture, or the barrier layer may simply protect the material from harm either during assembly or deployment.

The shield may be formed as a bulk solid, as layers or films, or as fibres, or a combination of these depending on the application.

In this invention we have identified a number of exemplary methods of making shield materials:
1) Pressing the absorber/hydride into a polymer box, typically made from ultra-high molecular weight polyethylene (UHMWPE).
2) Creating alternating layers of polymer and hydride and hot-pressing them into sheets.
3) Mixing a thermoplastic polymer and hydride as powders and using high pressures and/or high temperatures to sinter them into a solid block.
4) Creating a lacquer by dissolving the polymer and hydride in a co-solvent then casting flexible films of the material.
5) Creating a lacquer of the polymer and hydride in a co-solvent and producing fibres to create flexible material that can be used in complex geometries or for where flexibility is required, such as in space suits or inflatable structures.
6) A polymer/hydride lacquer may be impregnated into an open-cell polymer foam using a solution of the absorber in a solvent to dry within the matrix.
7) Using fibres of high hydrogen content polymers or fibres of the hydride and polymer and making a composite of this with a lacquer of a polymer in a solvent or a polymer and hydride in a solvent.
8) It is possible to use a thermosetting polymer as a binder. Because it would be inadvisable to use high temperatures to cure the resin this is best done using a two-part epoxy or a monomer and catalyst.

When we discuss a lacquer we mean a solution or suspension of hydride and/or polymer.

If a further barrier layer is needed, this may be obtained by using vacuum sealing or hot-pressing or a combination of both to seal a flexible impermeable barrier onto the outside of the material. Many commercial barrier materials are suitable for this purpose, made from layers of relatively impermeable polymers often sandwiched with a thin aluminized layer. In another embodiment this can be done by painting or spraying solutions or lacquers of a barrier polymer onto the surface of the material or by using physical vacuum deposition techniques to put down a thin layer of metal, preferably aluminium or aluminium oxide on the surface of the material.

Metallized polymer can also be added into and on the outside of the material to prevent etching of the composite by atomic oxygen in orbit.

With all these possible methods of manufacture it is preferable that the overall hydrogen content is above 14.4 wt. %. This means that the overall polymer content must be as low as possible; typically lower than 20% and if possible below 10%. It is also preferable to use polymers having a hydrogen content of greater than 6 wt. %, or more preferably greater than 8 wt. %.

The criteria we have used to select preferred polymers differs for the different manufacturing methods, but is broadly defined as follows:
Suitable polymers should also have a high hydrogen content; the polymers with the highest hydrogen contents are olefin-derived with two hydrogens for every carbon atom, such as polyethylene, polypropylene or poly(4-methyl-1-pentene).
The polymer needs to be structurally sound at the temperatures it will experience in space; we have chosen an upper cut off of 100° C. although for some applications this temperature could be higher.
The need for mechanical robustness means that high molecular weights are favoured.
For the material to be qualified for space applications it should also have a very low outgassing profile when in a vacuum, so that it will not contaminate other parts of the satellite or spacecraft.
For most of the processing methods the polymer either needs to be a thermoplastic or else soluble in suitable solvents to be able to form a lacquer.

The preferred polymers include polyethylene, polypropylene, poly(4-methyl-1-pentene) or blends of the these, amides such as nylon 6,6, polyvinyl alcohol, and polymers such as polyoxymethylene (also known as polyacetal). However, other polymers are described herein having other advantages and may not meet some or all of the above criteria. Furthermore, many co-polymers and blends could be used depending on the processing methods used.

Embodiments provide a spacecraft or spacesuit having a radiation shield, the shield comprising a hydrogen-containing material, compound or complex, and a polymer binder. The hydrogen containing compound or complex may also contain a neutron-absorbing element, such as boron or lithium. The radiation shield absorbs and dissipates the energy of high energy particles such as protons, electrons, helium nuclei and others described above to reduce their ability to cause damage, for example by ionization. The hydrogen-containing material is optionally also a neutron absorber. The types of spacecraft may be satellites or space stations. The invention is not however limited to these, but also includes any other types of spacecraft in which a reduction in exposure to the types of space radiation described above is desired.

The shield may comprise a first component which comprises a hydrogen-containing material or combination of materials, and a second component which is a polymer binder to hold the first component together thereby increasing its structural strength beyond that of the first component alone. The shield may be considered a composite.

The polymer binder may consist of single or multiple polymer types. The polymer binder may form a matrix through which the hydrogen-containing material is distributed to provide structural strength and rigidity.

The polymer binder may also confer other advantageous properties to the shield such as impact protection.

The polymer binder may encapsulate the hydrogen containing material. This is preferable if the material is sensitive to oxygen or moisture.

The shield may be formed as a bulk solid, as layers or films, or as fibres. A combination of forms may be used in the shield.

The binder may be a thermoplastic or thermosetting polymer.

If the binder is a thermoplastic polymer, it may preferably be polyethylene, or polypropylene as listed above. Alternatively it may be polyisobutylene, polybutadiene, poly(methylmethacrylate), polysulphone, polystyrene, poly(vinyl pyrrolidone), poly vinylidene fluoride, poly tetrafluoroethylene, poly ethylene oxide, poly vinyl acetate or polyester. It may be a co-polymer comprising two or more polymers. It may be poly(styrene-co-ethylene-ran-butadiene-styrene). If the binder is a thermosetting polymer, it may be polyepoxide, polyimide, polyamide, polyaramide or melamine formaldehyde.

The hydrogen-containing material is preferably an inorganic material. It may be a hydride.

The hydrogen containing material may be at least one of ammonia borane, ammoniumborohydride, methylammonium borohydride, an ammoniate of lithium borohydride, a methyl amine borane, ammonia triborane, or preferably ammonium octahydrotriborane, lithium borohydride, or beryllium hydride as listed above.

The shield may comprise a fibre mat.

Embodiments provide a method of manufacturing a radiation shield for a spacecraft or spacesuit, comprising: mixing a polymer or polymer precursor binder with a hydrogen-containing compound or complex; shaping the mixture; and allowing the mixture to solidify; and incorporating the solid in a radiation shield for a spacecraft. Optionally, the hydrogen-containing compound may comprise a neutron absorber such as boron or lithium.

The polymer may be a thermoplastic or a thermosetting polymer.

The hydrogen containing material preferably has a hydrogen content greater than 14%, 14.4%, 15%, or 16% by weight. More preferably the hydrogen content is 17% or more by weight. The maximum hydrogen content for an inorganic complex may be around 25%, which is that for ammonium borohydride.

The hydrogen containing material has a higher hydrogen content by weight than the polymer binder. The hydrogen-containing material is preferably a solid at temperatures from −40 degrees C. to 150 degrees C. The step of solidifying may occur through polymerisation. For example, a polymer monomer and hydride may be mixed together and then a polymerisation initiator, accelerator or catalyst is added before the mixture is poured into a mould. Polymerisation produces heat and so cooling may be required. Polymerisation can also create radicals so it may be necessary to keep the mixture in an oxygen-free environment.

The production of bulk material may also be achieved using epoxy. For example, the two halves of the epoxy (resin and hardener) are mixed with the hydrogen-containing material just prior to pouring into a mould.

The method may further comprise the step of adding a surfactant or dispersant prior to, or during, the step of mixing. A surfactant helps materials or solvents to wet each other by reducing the surface tension between the two. A dispersant is a special kind of surfactant that helps colloid systems to be better dispersed by preventing settling or clumping. The dispersant may be a non-ionic surfactant. More particularly, the dispersant may be a poloxamer (also known by the trade name Pluronics®), sorbitan monopalmitate, ethylenediamine tetrakis(ethoxylate-block-propoxylate)tetrol average and/or poly(ethylene glycol)-block-poly(propylene glycol)-block-poly(ethylene glycol).

The method may further comprise adding a polymerisation catalyst prior to, or during, the step of mixing.

The step of shaping may comprise pressing the mixture into a mould. The mould may be airtight to prevent absorption of moisture as the mixture sets. The mixture in the mould is preferably cooled. The mixture may be cooled to maintain its temperature below the decomposition temperature of the hydrogen containing material. The mould may be lined with releasing agent. Some hydrogen containing materials will require little or no cooling, such as lithium borohydride which is stable to 200° C.

The method may be carried out in an environment of reduced oxygen and/or water vapour.

The step of mixing may comprise mixing the polymer or polymer precursor with a boron- and hydrogen-containing compound or complex in a shared solvent or solvent blend to form a composite solution. A shared solvent is a solvent in which the polymer and hydrogen-containing material are soluble.

Melt casting may also be performed by pouring a liquid polymer into a mould with the hydrogen-containing material already mixed therein. Bulk solid material or sheets may be produced in this way.

The polymer precursor may be methyl methacrylate monomer, and the boron- and hydrogen-containing compound or complex may be ammonia borane.

The method may further comprise adding a catalyst prior to, or during, the step of mixing, wherein the catalyst is methyl ethyl ketone peroxide.

The polymer precursor may be epoxide, and the hydrogen containing compound or complex may be lithium borohydride.

The step of mixing may further comprise adding polyamine as a hardener and the resulting formation of polyepoxide as binder.

The step of shaping may comprise extruding a layer of solution onto a drum or belt and drying the layer to form a film or sheet.

The method may further comprise sandwiching the layer or film between sheets of oxygen- and/or moisture-impermeable polymer prior to the step of incorporating. Typically, the sheets may be high density polyethylene or polyisobutylene. In some embodiments the bulk or slab materials may also have oxygen- and/or moisture-impermeable polymer sheets bonded thereto.

The polymer or polymer precursor may be polyethylene oxide or poly(vinyl pyrrolidone), the boron- and hydrogen-containing compound or complex may be ammonia borane, and the step of mixing may comprise mixing the polyethylene oxide or poly(vinyl pyrrolidone) and ammonia borane in water.

A further method of making the shield material is to use sintering of a mixture of powdered polymer and hydrogen-containing material. Sintering may take place at elevated pressures or temperatures.

The step of mixing may comprise mixing the polymer or polymer precursor with a boron- and hydrogen-containing compound or complex in a shared solvent or solvent blend to form a composite solution, and the step of shaping may comprise electrospinning the composite solution to form fibres. Single phase electrospinning of this kind can also be performed using a polymer melt. The polymer melt may be mixed with a powdered hydrogen-containing compound or complex, having a decomposition temperature higher than the polymer melt temperature.

The polymer may be polyethylene oxide or poly (vinyl pyrrolidone), the hydrogen-containing compound or complex may be ammonia borane, and the shared solvent may be water.

Embodiments further comprise a method of manufacturing a radiation shield for a spacecraft, comprising: mixing a binder comprising a polymer or combination of polymers and/or polymer precursors in a first solvent, or combination of solvents, to form a shell solution, suspension or mixture; mixing a boron- and hydrogen-containing compound or complex in a second solvent or combination of solvents to form a core mixture; co-axially electrospinning the shell mixture through an outer, or annular, aperture of a coaxial nozzle, and the core mixture through a central, or core, aperture of a coaxial nozzle to form a fibre having a core formed solely or mostly of the boron- and hydrogen-containing compound or complex, surrounded by a shell formed of the polymer or combination of polymers mixed or formed from the polymer precursors; and incorporating the fibre in a radiation shield for a spacecraft.

Coaxial electrospinning can also be performed using a polymer melt as shell material, if a suitable high boiling-point fluid is used to dissolve or form a suspension with the hydrogen-containing material as a core mixture. Coaxial electrospinning may be performed at temperatures greater than 30 degrees C., with a shell mixture comprising a polymer solution or polymer melt and a core solution with suspended or dissolved hydrogen-containing material. This may include material with a decomposition temperature higher than the temperature of spinning.

The first (shell) and second (core) solvents are preferably immiscible.

The method may further comprise adding polymer to the core mixture.

The hydrogen-containing material may not be soluble, or may be only partly soluble, in the second solvent such that the core mixture is a colloid system or slurry.

The hydrogen-containing material may be ammonia borane and the binder may be polystyrene, polypropylene, poly vinylidene fluoride, polyisobutylene or polybutylene.

The shell mixture may be a solution, and the solvent may be toluene and/or xylene and/or N,N-dimethylformamide and/or N-dimethylacetamide and/or dimethyl sulphoxide. The core mixture may be a slurry of ammonia borane in water with poly (ethylene oxide).

BRIEF DESCRIPTION OF THE DRAWINGS

Embodiments of the present invention, along with aspects of the prior art, will now be described with reference to the accompanying drawings, of which.

DETAILED DESCRIPTION

Polyethylene is used in the International Space Station (ISS) as a radiation shield because this is a stable non-toxic material with high hydrogen content. The amount of hydrogen by weight for polyethylene is 14%.

Some boron and hydrogen containing compounds have a hydrogen percentage by weight which is greater than for polyethylene. For example, ammonia borane has greater than 19% hydrogen by weight. Boron is also an excellent neutron absorber and as mentioned above, although space radiation does not contain neutrons, the nuclear fragmentation which occurs due to bombardment with high energy radiation does produce neutrons. Therefore, hydrogen- and boron-containing compounds such as ammonia borane provide better radiation shielding than polyethylene with the added advantage of also absorbing neutrons. Other solid materials with a high hydrogen content include those based on lithium, and beryllium (such as $BeH_2$). Lithium is also a good neutron absorber. The neutron-absorbing isotope of boron is boron-10 and the neutron-absorbing isotope of lithium is lithium-6. Using hydrogen-containing compounds or complexes enriched with these lighter isotopes confers both improved neutron absorption and a higher hydrogen weight content in the materials. Lithium has a neutron absorption coefficient of 70.5 barns which increases to 940 for lithium-6. Boron has a neutron absorption coefficient of 767 barns which increases to 3835 for boron-10.

Ammonia borane is a waxy solid with little structural strength. A number of other boron compounds with high hydrogen content are available but many do not have the required structural strength or stability alone for use in a radiation shield. Compounds of hydrogen and beryllium provide further alternatives. Table 2 lists examples of various hydrogen and boron or beryllium compounds along with wt % of hydrogen and their stability.

The present invention provides composite and encapsulated materials for use as a radiation shield in spacecraft and methods of manufacturing the material.

Part 1A

FIGS. 2 to 8 and the following description relate to methods of manufacturing materials according to a first set of embodiments.

Figure 2:
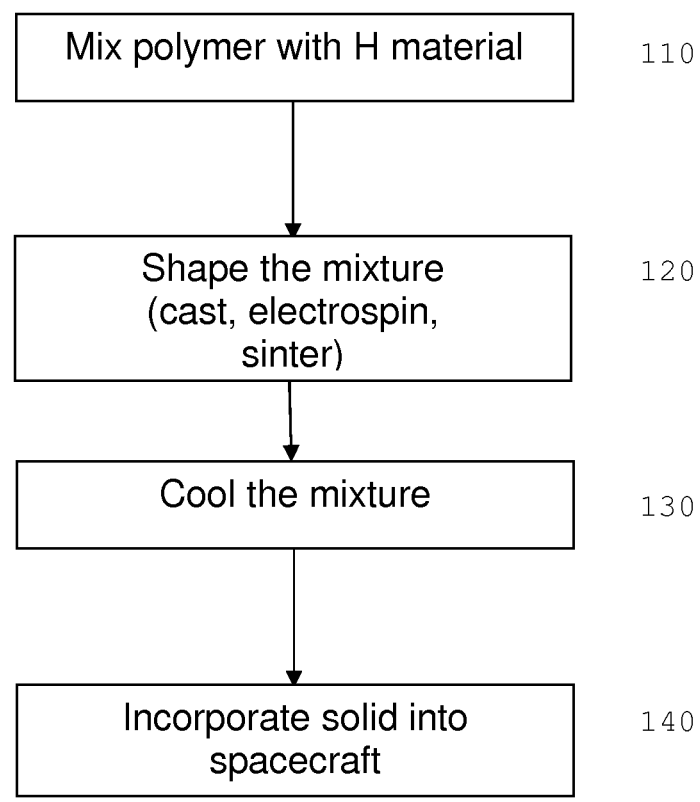
FIG. 2 is a flow chart showing steps in manufacturing a spacecraft with a shield according to the present invention.

FIG. 2 is a flow chart showing a method of manufacturing a spacecraft having a shield. A hydrogen-containing compound or complex is used as an absorber of energy from high energy electrons, protons etc for the shield. This is mixed with a polymer, or a combination of polymers or polymer precursors. The polymers or polymer precursors may be a liquid or in a solution. This mixing step is shown at step 110. Thermosetting plastics and thermoplastics may be used as the polymer binder. Thermoplastics are formed when a catalyst is added to the monomer. Thermosetting plastics form through a mixture of a resin and a hardening agent. In both cases the chemical reaction will generate heat. The mixture of hydrogen-containing compound and binder should be actively cooled to below the hydrogen-containing compound decomposition temperature to prevent degradation and release of hydrogen.

After mixing the mixture will begin to set and any solvents used will begin to evaporate. The material should be shaped immediately after mixing, for example by pressing into a mould. The step of shaping is shown at 120 in FIG. 2. Material pressed into a mould, or cast, will produce slabs of shield material in which the hydrogen-containing compound is distributed throughout the binder and is held in a matrix of binder. The percentage by weight of the binder and hydrogen-containing compound is such that the majority of the slab is

TABLE 2

| Compound | Formula | Hydrogen Content | Stability |
| --- | --- | --- | --- |
| Ammonia borane | $NH_3BH_3$ | 19.6 wt % | Loses H slowly above 50° C. Melts & Degrades at 105° C. |
| Ammonium borohydride | $NH_4BH_4$ | 24.5 wt % | Loses H above room temperature |
| Methylammonium borohydride | $CH_3NH_3(BH_4)$ | 21.4 wt % | Loses H rapidly above 40° C. |
| Ammoniates of lithium borohydride | $Li(NH_3)_nBH_4$ (n = 1-3) | 18.1 wt % (n = 1) 17.9 wt % (n = 2) 16.5 wt % (n = 3) | Loses H at 200° C. Melts at 57° C. |
| Methyl amine borane | $(CH_3)_nNH_{3-n}BH_3$ (n = 1-2) | 18.1 wt % (n = 1) 17.9 wt % (n = 2) | |
| Ammonia triborane | $NH_3B_3H_7$ | 17.7 wt % | |
| Beryllium borohydride | $Be(BH_4)_2$ | 20.84% | Releases hydrogen at 123° C. |
| Ammonium octahydrotriborate | $NH_4B_3H_8$ | 20.53% | Melts around 120° C. |
| Lithium borohydride | $Li(BH_4)$ | 18.4-18.51 wt % | Stable up to 275-300° C. Reacts with moisture and oxygen |
| Tetramethyl ammonium borohydride | $(CH_3)_4NBH_4$ | 18.12 wt. % | Melts at 300° C. |
| Beryllium Hydride | $BeH_2$ | 18.28 wt. % | Releases hydrogen at 250° C. |

Some of the above materials are not sufficiently stable and must be stabilized before they will be useful as a shield material. Some of the materials are also sensitive to air and moisture and will require protection or encapsulation if exposed to atmosphere in processing or during use. The hydrogen content shown may be improved further by using materials enriched with boron-10 and/or lithium-6.

hydrogen-containing compound. To permit easy removal of the slab from the mould, the mould may be lined with a releasing agent. As well as slabs, other shapes of mould may be used to fabricate other shapes of shield material. After shaping the material, for example by pressing into a mould, the cooling of the mixture should continue, as indicated at step 130 in FIG. 2.

The binder provides structural rigidity while also protecting the hydrogen-containing compound from oxygen and moisture. This protection allows it to be handled during assembly on earth as well as allowing it to be used inside satellites or space stations. The rigidity provided by the binder also permits use as an independent structure outside, or spaced from, a spacecraft.

Once the mixture has cooled and set, the shield material can be incorporated in a spacecraft as shown at step 140 in FIG. 2.

In an alternative embodiment, the process of mixing hydrogen-containing compound and binder together and shaping the mixture may be performed simultaneously.

Examples of suitable polymers for the binder include poly (methyl methacrylate), polyethylene, polypropylene, polystyrene, poly vinylidene fluoride, polybutylene, polybutadiene, polyisobutylene polyester, and co-polymers comprising two or more of these. An example of a copolymer may be SEBS. These polymers are thermoplastics. Other examples of suitable polymers include polyepoxide, polyimide, polyamide, polyaramide and melamine formaldehyde. These are thermosetting plastics. Another alternative is polyethylene oxide or poly(vinyl pyrrolidone). Preferably molecular weights of greater than 1,000,000 (1M) and preferably 2M, 4M or 8M polyethylene oxide are used.

Depending on the compatibility of the hydride and monomer it may be necessary to use surfactants to reduce the surface tension between the absorber and polymer monomer in solution to keep the absorber in suspension until casting is complete. For example, the absorber is likely to be a strongly polar molecule whereas the polymer may only have weak polarity. This may mean there is a difference in the types of solvent in which the absorber and polymer will be soluble. The surfactant improves the solubility of the absorber and/or polymer in the chosen solvent or solvent blend. The surfactant may be a non-ionic surfactant. Typically, the surfactant may be sorbitan monopalmitate, ethylenediamine tetrakis(ethoxylate-block-propoxylate)tetrol average and/or poly(ethylene glycol)-block-poly(propylene glycol)-block-poly(ethylene glycol).

Alternative embodiments provide different shaping techniques to the above casting technique. A first alternative is to use solution casting. In this technique the hydrogen-containing compound and binder are dissolved in a common solvent or combination of solvents. The use of a single solvent in which the binder and hydrogen containing material are both soluble limits the choice of binders and solvents that can be used. After mixing the solution a thin layer of solution is extruded onto a drum or belt. As the solvent evaporates the hydrogen containing material adheres to the binder to form a solid solution or mixture. After evaporation a film of less than 500 μm thickness is produced, such as a film 10 s or 100 s of microns thick. Some of the hydrogen containing material mentioned above are sensitive to air or moisture. In such cases thin sheets of gas- and moisture-impermeable polymer, for example high-density polyethylene or polyisobutylene, are bonded to either side of the shield material. For shielding applications a large number of layers of the film will need to be stacked together to create the required thickness or areal density of absorber. Such a stacking process is a widely performed industrial process and is not expensive.

A second alternative is to use electrospinning to produce fibres. The produced fibres have micron- or sub-micron scale dimensions. Electrospinning is the process of extruding a solution or melt through a nozzle where a large electrostatic field causes a jet to issue from a Taylor cone. Solvents in the jet evaporate, or the melt solidifies, such that as the jet is pulled by the electrostatic field a fine fibre is produced.

Electrospinning can be performed in two ways: single phase electrospinning and co-axial electrospinning (also known as co-phase spinning or co-electrospinning). In single phase electrospinning the hydrogen containing material and binder are mixed in a common solvent in which both hydrogen containing material and binder are soluble, in a similar way to the solution cast method. The solution, or mixture, is fed to a nozzle with a single aperture to electrospin the fibre. Single phase electrospinning is not suitable for air- and moisture-sensitive hydrogen-containing absorber materials without further processing and encapsulation in a gas-impermeable layer. This is because the surface area of the fibres is large in comparison to bulk material so a large amount of absorber will be subjected to air or moisture.

Co-axial electrospinning uses a nozzle having a central aperture surrounded by an annular aperture to produce a fibre having a central core surrounded by an outer shell. The binder is dissolved in, or mixed with, a first solvent or combination of solvents to form a binder solution or mixture. The absorber is dissolved in, or mixed with a second solvent or combination of solvents to form an absorber solution or mixture. The two solvents, or combinations of solvents, are preferably immiscible. The binder mixture is supplied to the outer aperture of the nozzle, namely the annular aperture. The absorber mixture is supplied to the inner aperture of the nozzle, namely the central core aperture. Electrospinning is then the same as for the single phase method. The absorber mixture may also include a small quantity of polymer to maintain stability during electrospinning and prevent collapse of the fibre as the solvents evaporate.

The fibres produced from single phase or co-axial electrospinning techniques can be packed into complex shapes to fit in the spacecraft. The fibres may be produced as a non-woven mat. The fibres are flexible, which allows them to be easily fitted into small and complex spaces, or can be made into moving or flexible parts such as in spacesuits or inflatable structures. Nevertheless, because the fibres pack with gaps between them, there will be some unused space between the fibres which will result in a reduction in absorber density compared to slab materials. A packing fraction for fibres is 0.8.

Another alternative is sintering in which fine powders of polymer and hydrogen-containing material are mixed together. The powder mixture is then sintered under pressure or heat to form the material into the required shape. Any heat applied during the sintering process should not result in a temperature being exceeded above which the hydrogen-containing material decomposes.

Figure 3:
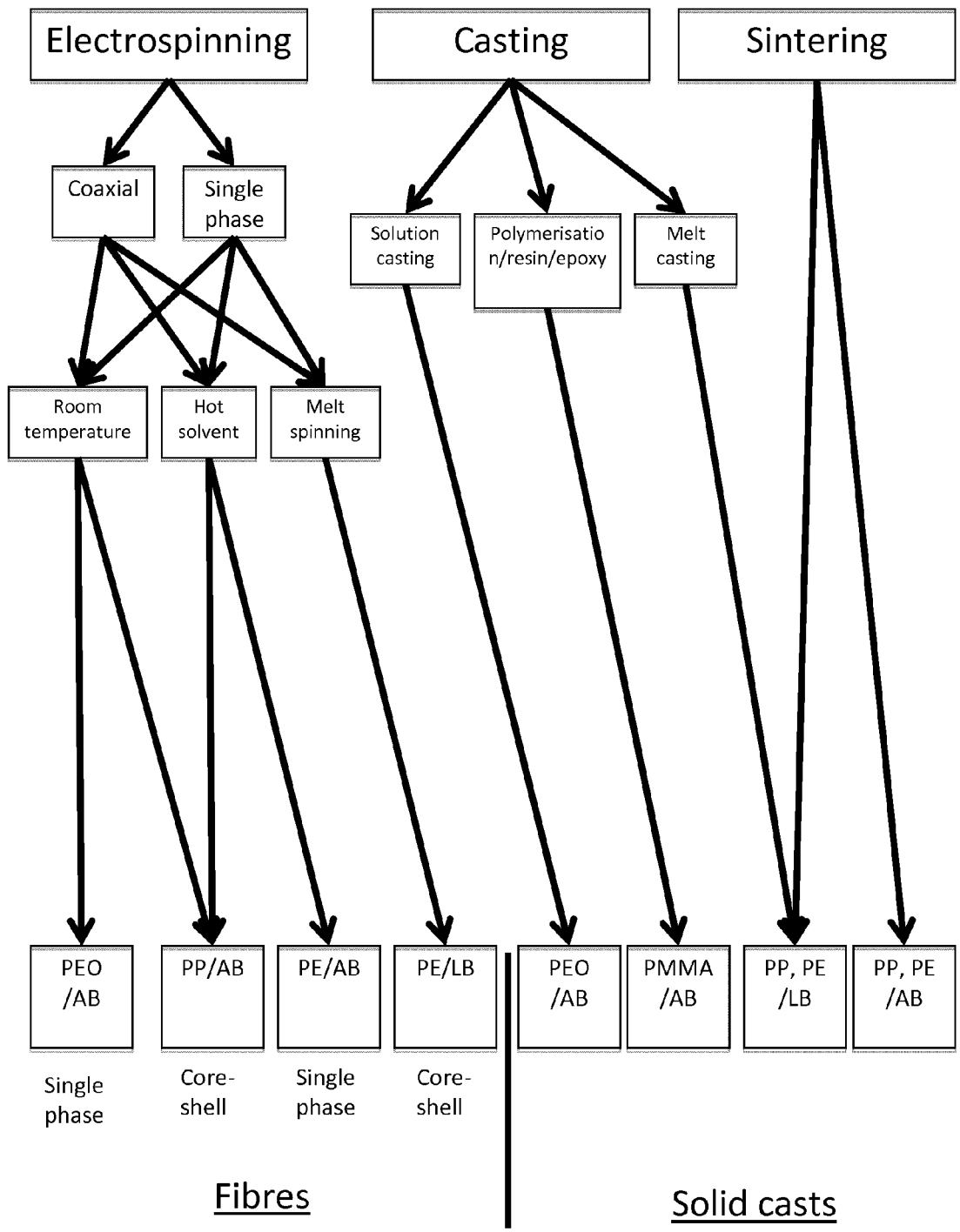
FIG. 3 is a chart summarising exemplary manufacturing techniques and material examples.
Figure 12:
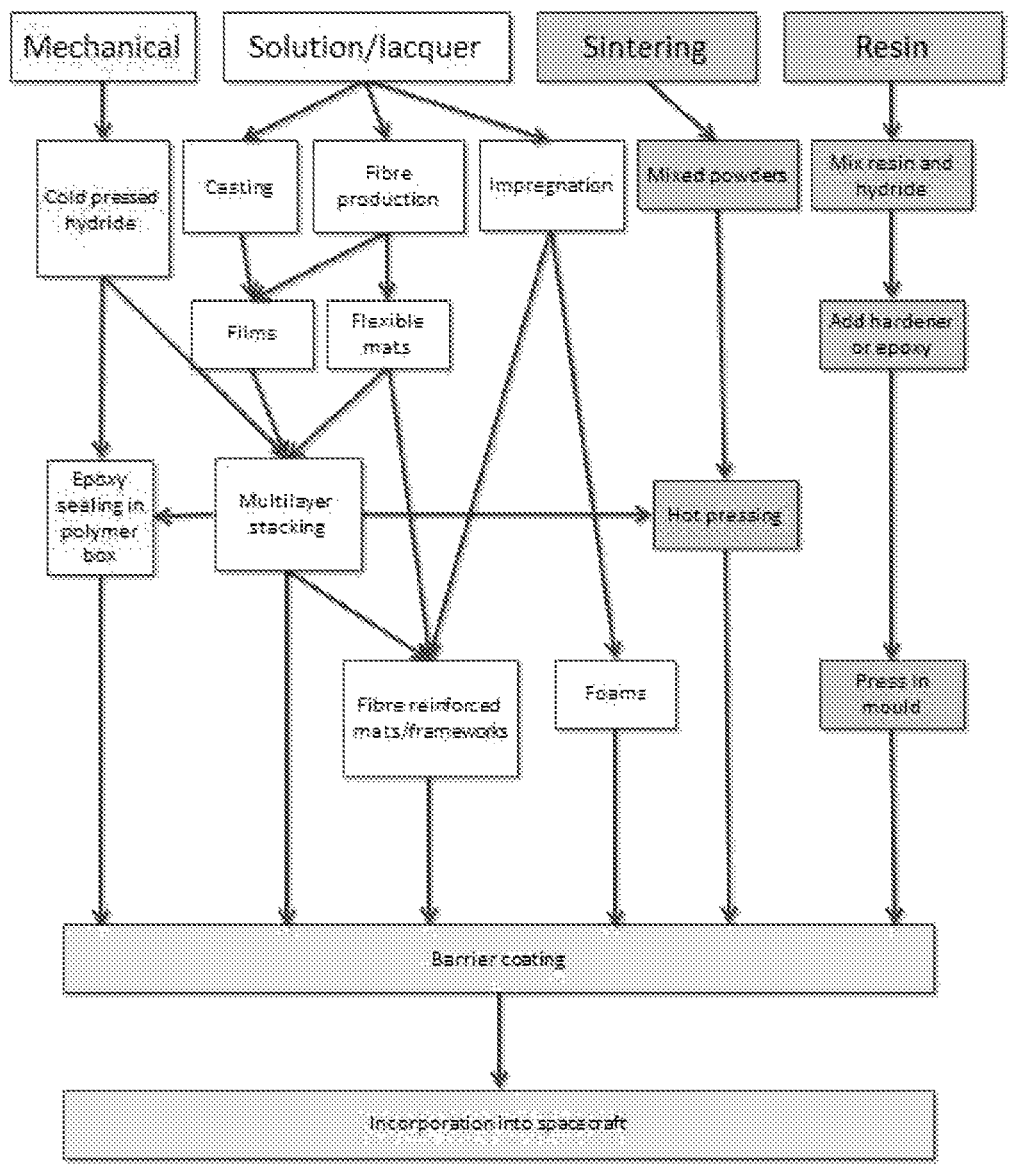
FIG. 12 is a chart showing relationships between the various techniques according to a second set of embodiments.

A summary of techniques with examples of compounds that may be used is shown in FIG. 3. The examples are not considered limiting and other techniques for those materials may be used. In the figure the following abbreviations are used:

PEO=polyethylene oxide
PP=polypropylene
PE=polyethylene
PMMA=poly methyl methacrylate
AB=ammonia borane
LB=lithium borohydride The techniques listed in FIG. 3 can be summarised as:
i) sintering of a mixture of polymer and hydrogen containing material in powdered form;
ii.a) casting by solution or melt;
ii.b) casting by polyemerisation, resin, or epoxy; and
iii) single phase and coaxial electrospinning Part 1B The following description relates to preferred methods of manufacturing materials according to a second set of embodiments. The second set of embodiments are summarised in FIG. 12 which the relationships between the various techniques.

i) Pressing the Hydride Into a Box

Figure 13:
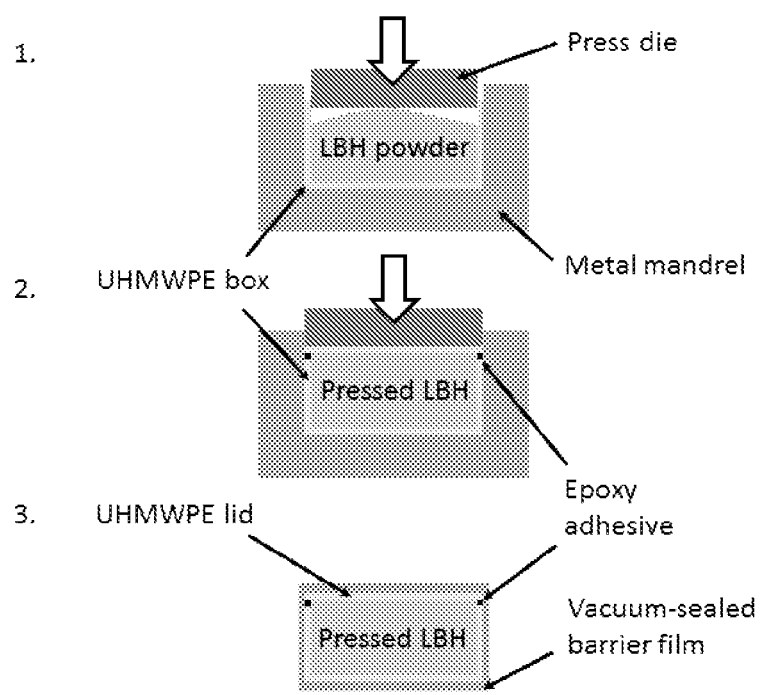
FIG. 13 is a flow diagram illustrating method steps of an embodiment in which hydride is packed into a polymer box.

In this embodiment a box is machined from ultra-high molecular weight polyethylene (UHMWPE). The box should have walls that are as thin as possible to minimise the overall polymer content, but sufficiently thick to ensure that the overall structure has sufficient structural rigidity to survive the assembly and the vibration of launch. Typically this will be at least 1 mm. A metal mandrel then needs to be constructed that is a snug fit to the outside of the box and a metal press die made that is a snug fit to the inside. The hydride can then be pressed into the box using the die and a press at sufficiently high pressures to ensure maximum density. A polyethylene lid can then be fixed to the top of the box using adhesive or welding. The steps of the method are illustrated in FIG. 13.

This method will work for all hydrides, but those that are more air sensitive or reactive will have to be handled in an inert atmosphere and will need a further oxygen and moisture barrier layer.

ii) Making Layered Materials

In this embodiment, sheets of the hydride made through pressing or solution casting are combined in alternating layers with thin sheets or a fabric of a thermoplastic polymer and the resulting multilayer is then hot-pressed into blocks. Suitable polymers for this technique include polyethylene, polypropylene or blends of the two, nylons of various types, polyvinyl alcohol, polystyrene, poly(4-methyl-1-pentene) or polyacetal, although any high hydrogen content thermoplastic would be suitable. These are thermoplastics that have high hydrogen concentrations and low vacuum outgassing.

High strength plain-woven construction fabric made from carbon fibres or Kevlar fibres or UHMWPE fibres could substitute the thin sheets of hydride or polymer to enhance the mechanical strength of the final composite.

Layers of gas-impermeable polymers or even thin layers of a metallized plastic could be incorporated into the structure to protect hydrides from air and moisture. Metallized polymer can also be added into and on the outside of the material to prevent etching by atomic oxygen in orbit.

iii) Sintering the Polymer/Hydride Using Pressures and/or Temperatures

It is possible to use high pressures and/or temperatures to press a solid block from a mixture of polymer and hydride powder. This technique follows from the sintering method set out in part 1A. The can be done with a press, or by using extrusion techniques such as twin-screw, single-screw or ram extrusion to make slabs or films. Suitable polymers for this technique include polyethylene, polypropylene or blends of the two, nylons of various types, polyvinyl alcohol, polystyrene, poly(4-methyl-1-pentene) or polyacetal, although any high hydrogen content thermoplastic would be suitable. These are thermoplastics that have high hydrogen concentrations and low vacuum outgassing.

This method will work for all hydrides, but those that are more sensitive will have to be handled in an inert atmosphere and will need a further oxygen and moisture barrier layer.

iv) Film Production

By dissolving the hydride and polymer into a co-solvent to make a lacquer it is possible to create films by solution casting techniques. This technique follows from the film production method set out in part 1A. The lacquer needs to be relatively viscous, and since it is necessary to minimise the amount of the polymer compared to the hydride this is achieved by using high molecular weight polymers.

The lacquer is then extruded onto a drum or belt where it is dried to form a film of less than 500 µm thickness. If necessary the belt or drum can be heated or placed under vacuum to facilitate the removal of the solvent. The whole process may also need to be done in a dry atmosphere to protect the hydride from moisture.

This process could also be used to create layered structures where the lacquer is sprayed onto a thin layer of a relatively gas impermeable polymer and second layer of polymer bonded on top of the resulting hydride layer.

v) Fibre Production

By using the lacquer described in the previous embodiment it is possible to make the material into fibres dry or gel spinning techniques or techniques such as electrospinning. These fibres can be used as a mat or woven into a flexible cloth that can be used for applications such as spacesuits or inflatable structures. This technique follows from the fibre production method set out in part 1A.

vi) Fibre-Reinforced Structures

This embodiment comprises taking the fibres described in the previous embodiment, and/or fibres of a high hydrogen content, high-molecular weight polymer, and using these fibres or fibre mats to make the framework of the desired structure. The framework can be covered or intercalated with a lacquer of the polymer or the polymer/hydride mixture. By arranging the orientation of the fibres within the structure it is possible to create irregular structures with excellent mechanical properties.

For the air-sensitive hydrides it may be necessary or desirable to add a coating on the outside of the finished object consisting of either a gas impermeable polymer and/or a metallized layer.

vii) Impregnating Foams

By starting with a lacquer of the hydride in solution it is possible to fill the pores in an open cell polymer foam to produce a composite structure which has a continuous polymer network and hence some structural rigidity. To get a high density of the hydride within the network it may be necessary to fill the pores with the lacquer and allow it to dry several times.

For the air-sensitive hydrides it may be necessary or desirable to add a coating on the outside of the finished object consisting of either a gas impermeable polymer and/or a metallized layer.

viii) Using a Thermoset Polymer Binder

Thermoplastics are formed when a catalyst is added to the monomer or form through a mixture of a resin and a hardening agent.

By mixing the monomer or first part of the epoxy with the hydride to form a paste then mixing the catalyst or hardening agent and pressing the paste into a mould it is possible to form components with complex shapes.

However the chemical reaction will generate heat. The mixture of hydrogen-containing compound and binder should be actively cooled to below the hydrogen-containing compound decomposition temperature to prevent degradation and release of hydrogen.

After mixing the mixture will begin to set and any solvents used will begin to evaporate. The material should be shaped immediately after mixing, for example by pressing into a mould. The step of shaping is shown at 120 in FIG. 2. Material pressed into a mould will produce a composite material in which the hydrogen-containing compound is distributed throughout the binder and is held in a matrix of binder. The percentage by weight of the binder and hydrogen-containing compound is such that the majority of the slab is hydrogen-containing compound. To permit easy removal of the slab from the mould, the mould may be lined with a releasing agent. As well as slabs, other shapes of mould may be used to fabricate other shapes of shield material. After shaping the material, for example by pressing into a mould, the cooling of the mixture should continue, as indicated at step 130 in FIG. 2.

Part 2A

We now describe examples of specific embodiments of the techniques according to the first set of embodiments set out in FIGS. 2 to 8.

First Example

Figure 4:
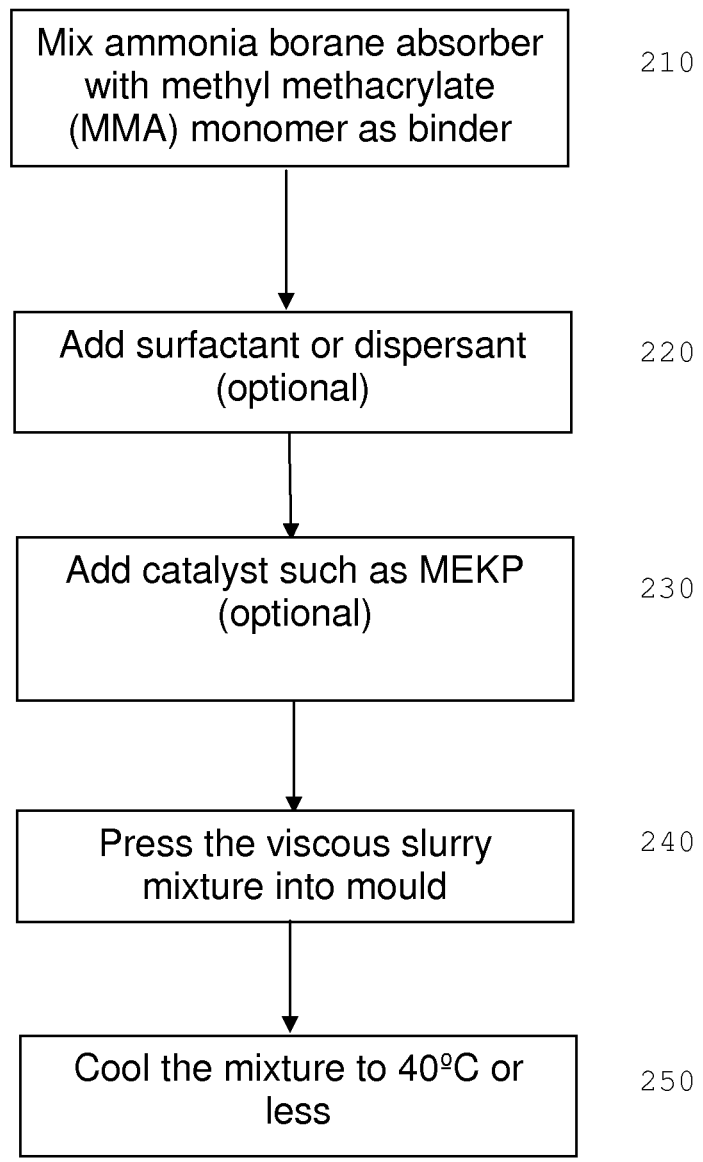
FIG. 4 is a flow chart showing steps in manufacturing a material for a spacecraft shield according to a first detailed embodiment using casting of thermoplastics.

As a first specific embodiment, we cast a shield slab having ammonia borane as the absorber in a poly(methyl methacrylate) binder. The steps of this method are shown in FIG. 4. At step 210 ammonia borane was mixed with the monomer, methyl methacrylate liquid using a shear mixer. A surfactant or more preferably a dispersant was added to the mixture to keep the ammonia borane in suspension for a sufficiently long time to allow the mixture to be handled and to solidify. This is shown at step 220. Since poly(methyl methacrylate) is a thermoplastic polymer a catalyst is used to initiate the polymerisation of the monomer. In this case methyl ethyl ketone peroxide (MEKP) was used as catalyst. At step 230 this is mixed in with the monomer and ammonia borane to produce a viscous slurry. The slurry is pressed into an airtight mould at step 240. Ammonia borane starts to lose hydrogen at 50° C. so the temperature of the contents of the mould are actively maintained below this, such as at 40° C. or less, as shown at step 250. This example produces shield slabs of polymethyl methacrylate and ammonia borane (PMMA/AB in FIG. 3). The ratio of ammonia borane absorber to polymer binder is at least 80:20 wt % and even as high as 90:10 wt %.

A similar method may be used for resins or epoxies where the polymer or precursor is a liquid and is mixed with the hydrogen-containing material. An initiator can then be added to start hardening or polymerisation.

Second Example

Figure 5:
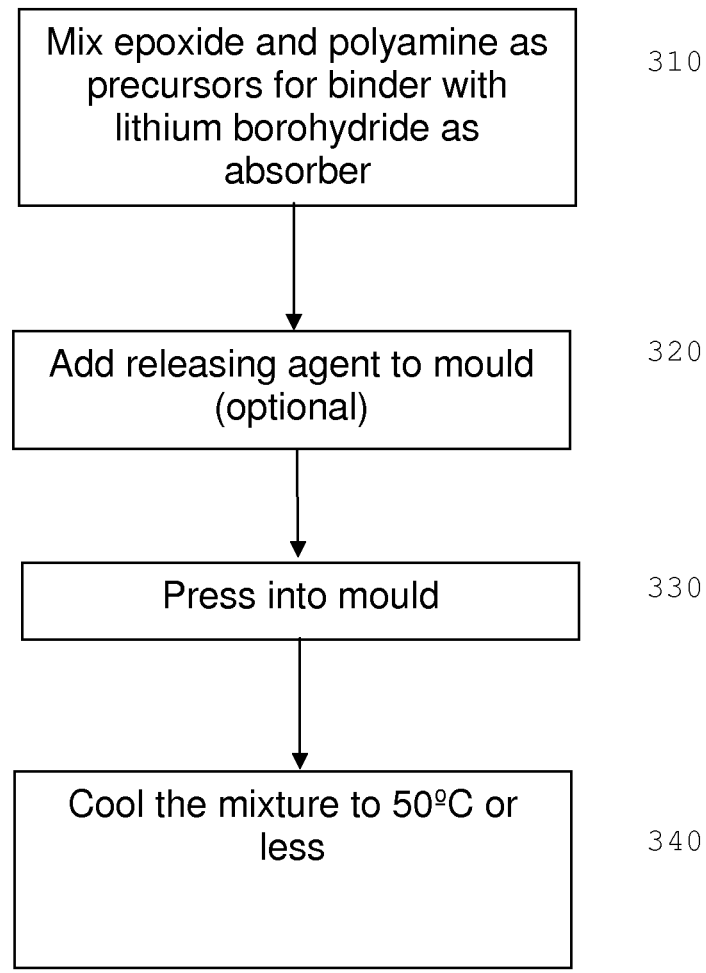
FIG. 5 is a flow chart showing steps in manufacturing a material for a spacecraft shield according to a second detailed embodiment using casting of thermosetting plastics.

FIG. 5 shows the steps of a second specific embodiment which uses lithium borohydride in epoxide. Epoxide was mixed with lithium borohydride and polyamine in an inert atmosphere at step 310. Epoxide is a thermosetting epoxy resin and the polyamine acts as hardener. The mould is lined with releasing agent at step 320. The mixture is pressed into the mould (step 330) and allowed to set.

Third Example

Figure 6:
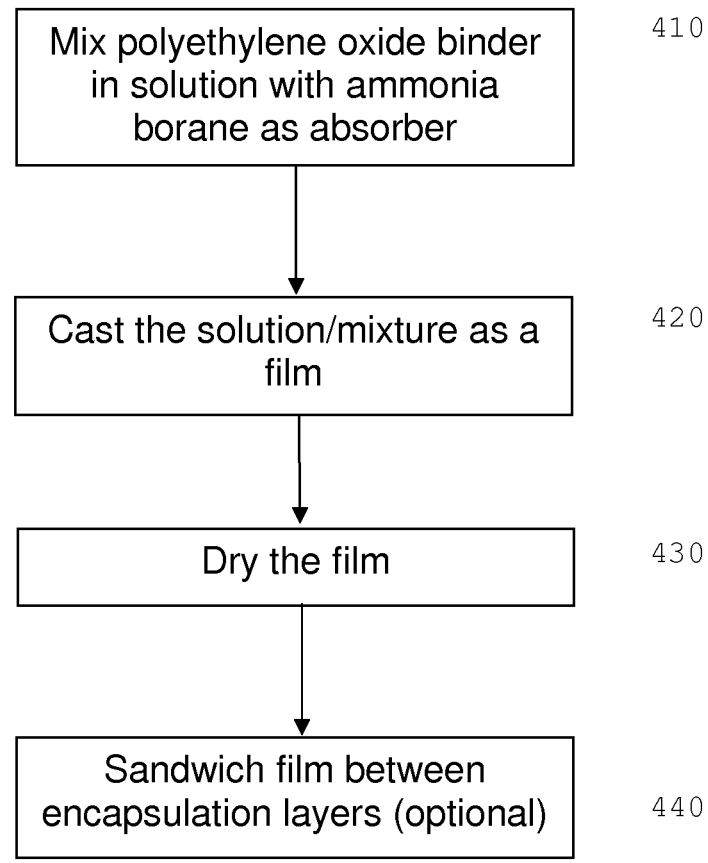
FIG. 6 is a flow chart showing steps in manufacturing a material for a spacecraft shield according to a third specific embodiment using solution casting.

A third specific embodiment used the solution cast technique. The method steps are shown in FIG. 6. The materials used were polyethylene oxide (PEO) as binder and ammonia borane as absorber in water. 2,000,000 (2M) molecular weight polyethylene oxide at a concentration of around 3 wt % was used, and mixed (step 410) with ammonia borane at a concentration of around 8-10 wt % in water. The mixture was stirred and at the same time heated to 30-40° C. for several hours. The solution was then extruded on to a drum to form a film (step 420) and allowed to dry (step 430). The resultant film has a ratio of ammonia borane to polyethylene oxide of 70:30 wt %. This technique is shown in the summary of FIG. 3 as PEO/AB from solution casting. This composition has a preferred combination of structural strength and high hydrogen content, although higher ammonia borane contents by weight are possible, for example 80:20 wt % and 85:15 wt % Ammonia borane is hygroscopic and absorbs moisture from the air. In the environment of space this will not be a problem. However, the spacecraft will be assembled, at least partly, on earth where moisture can be absorbed. The structure of the film may be impaired by the absorption of water, so the film may be encapsulated in polyethylene sheets bonded on either side of the film (step 440).

Fourth Example

Figure 7:
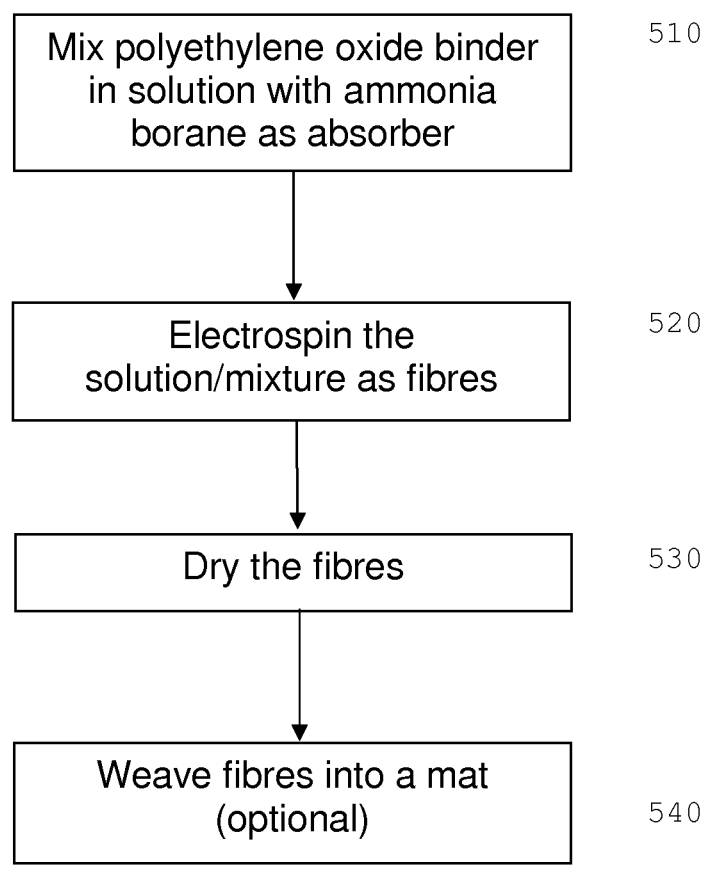
FIG. 7 is a flow chart showing steps in manufacturing a material for a spacecraft shield according to a fourth specific embodiment using single phase electrospinning.

FIG. 7 lists the method steps of a fourth specific embodiment. This embodiment used polyethylene oxide as binder and ammonia borane as absorber. The technique used to produce the shield material was single phase electrospinning. The materials used were similar to the solution cast technique. 2M molecular weight polyethylene oxide at a concentration of approximately 3 wt % was taken and mixed with ammonia borane at a concentration of 8-10 wt % in water, as shown at step 510. The mixture was stirred for several hours at room temperature. The resulting solution was electrospun at step 520 using conventional single phase spinning. The fibres usually dry during the electrospinning process, but may be dried further afterwards. Drying is listed at step 530. The produced fibres have a ratio of ammonia borane to polyethylene oxide of 70:30 wt % and this material is listed as PEO/AB single phase fibres in summary FIG. 3. This composition has a preferred combination of structural strength and high hydrogen content, although higher ammonia borane contents by weight are possible, for example 80:20 wt % and 85:15 wt %. The produced fibres may be optionally moulded, collected or woven together to form a mat at step 540.

Fifth Example

A fifth specific embodiment produced core-shell fibres with ammonia borane encapsulated by polypropylene. The preparation technique was coaxial electrospinning. The steps of the method are shown schematically in FIG. 8. The core solution or mixture comprised a 10-15% solution of ammonia borane in N,N-dimethylformamide and is prepared at step 610. A small amount of polymer, polyethylene oxide, was added to the core solution to maintain stability during spinning. The shell solution or mixture comprised polypropylene of molecular weight 250,000 at concentrations of 10-15 wt % in cyclohexane or xylene mixed with 10-20 wt % acetone or N,N-dimethylformamide. This is prepared at step 620. At step 630, the core and shell solutions or mixture were coaxially electrospun to produce fibres having at least 40 wt %, and preferably at least 50 wt % ammonia borane content. As mentioned above for single phase electrospinning, the fibres dry during electrospinning or can be dried further afterwards, as shown at step 640.

The practical limit for core:shell weight ratio appears to be 50:50 because of shell viscosity and flow rate requirements. This ratio of AB to PS produces only a 14 wt % material. To improve on this a polyolefin (PE, PP, possibly polyisobutylene, polybutylene and co-polymers thereof) shell is required. PP dissolves at elevated temperatures but can be spun at below <30° C. so 50:50 PP:AB fibres are possible without AB decomposition producing ~17 wt % H.

Optionally the fibres can be collected or woven to form mats of shield material. The five techniques described above are examples and numerous variations in the materials for the binder and hydrogen-containing absorber may be made without departing from the scope of the invention. Furthermore, the moulding and shaping techniques described may be interchanged to use other materials described.

In a final embodiment polyethylene as a current preferred choice for shield materials could be used as the binder according to the present invention. However, polyethylene (PE) is insoluble in most common solvents which makes its use in solution casting or electrospinning difficult. Polyethylene is normally manufactured using gaseous precursors and this also prevents use by the bulk casting technique. However, it is also possible to sinter the hydride and polyethylene into composite materials using high pressure techniques. For example, powdered lithium borohydride and polyethylene can be mixed together and subjected to high pressures in a press or through extrusion to make solid or flexible sheets, or shaped bulk materials.

This example embodiment may optionally include melting the polyethylene and carrying out melt casting as the decomposition temperature of lithium borohydride is above the polyethylene melting temperature. Polyethylene can be dissolved and electrospun in solvents such as cyclohexane or xylene at elevated temperatures, typically above 100 degrees C. Therefore a material may be made in a version of the fifth embodiment stated above, where single-phase or co-axial electrospinning at temperatures of 100 degrees C. or higher is used, and where a solution or suspension of the hydrogen-containing material with decomposition temperature higher than 100 C is combined with a polyethylene solution either as a single phase or as a core-shell composition. Other polymers with a similar hydrogen content that could be processed in a version of this embodiment include polybutylene, polyisobutylene and polypropylene.

Table 3 below summarises some of the materials described above.

TABLE 3

| | AB:polymer ratio | Hydrogen wt % | Density g/cm3 | Packing density | H density g/cm3 |
|---|---|---|---|---|---|
| PMMA + AB by casting | 90/10 | 18% | 0.81 | 1.0 | 15.0 |
| PEO + AB by spin casting | 80/20 | 17% | 0.86 | 1.0 | 15.0 |
| PEO-based fibres | 80/20 | 17% | 0.86 | 0.8 | 12.0 |
| PP-based fibres | 70/30 | 18% | 0.83 | 1.0 | 14.8 |

Figure 1A:
FIGS. 1a to 1c are photos of the structure of materials made according to the present invention.
Figure 1B:
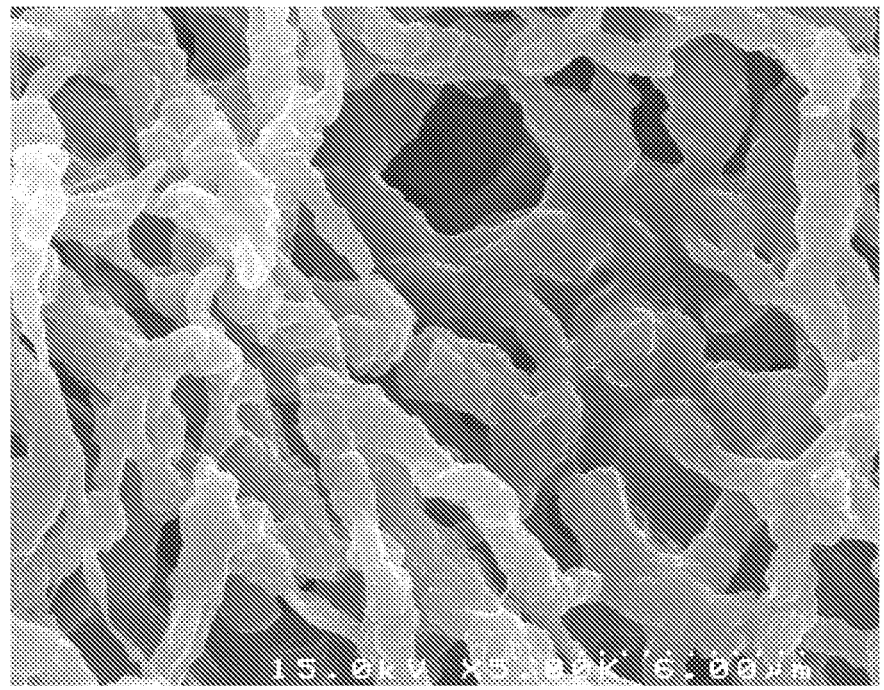
Figure 1C:

FIG. 1 shows some shield materials manufactured according to the above techniques. FIG. 1a shows a fibre pellet. FIG. 1b shows PEO-AB spun fibres. FIG. 1c shows sheets of material.

Part 2B

The following description relates to preferred methods of manufacturing materials according to a second set of specific embodiments.

The first example is lithium borohydride (LBH) in a box machined from ultra-high molecular weight polyethylene (UHMWPE). The base and lid of the box are machined from a solid block of UHMWPE. Alongside the box a mandrel is machined from aluminium to be a snug fit to the outside of the box, so it can support the plastic during the loading of the hydride. A die is also made from aluminium to be a tight fit to the inside of the box.

The LBH powder is outgassed in a vacuum at 125° C. for 3 hours to remove as much solvent as possible. A small amount of the LBH is placed in the UHMWPE box, which is supported by the mandrel, and the LBH is pressed in a hydraulic press using pressures above 0.5 MPa to produce a thin layer of solid LBH. More LBH powder is added and pressed until the box is full. The whole procedure needs to be done in an inert, or at the very least a dry, atmosphere to ensure that the LBH does not oxidize. Using these pressures it is possible to approach the theoretical density of solid LBH in the pressed hydride cake (0.67 g/cm$^3$).

Once full, a lid made from 1 mm UHMWPE is fixed to the base using a special polyethylene epoxy adhesive. Care is taken to keep the epoxy adhesive from coming into contact with the LBH.

Figure 14:
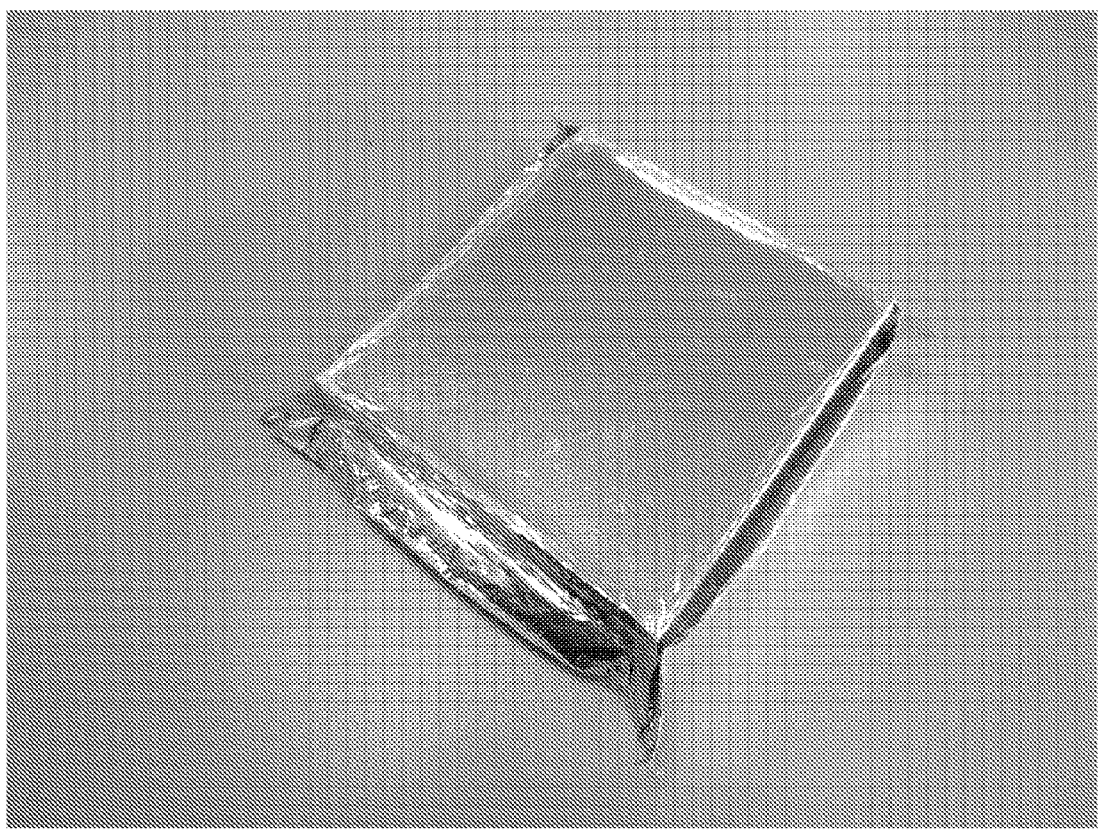
FIG. 14 shows an example of the hydride packed polymer box with an outer layered material added for gas impermeability.

The adhesive is partially gas-permeable so another barrier layer must be added. This is in the form of a layered material made from polyethylene, aluminized polyester and an outer layer of nylon. This is vacuum sealed onto the outside of the box. FIG. 14 shows an example of the box with outer layered material added.

A second specific embodiment involves taking vacuum-dried lithium borohydride (LBH) powder outgassed to 120° C., placing it an aluminium mould whose base and sides are lined with 500 μm thick sheets of polyethylene. A die that closely fits within the mould and polyethylene liner is used in conjunction with a hydraulic press to form the powder into a dense layer 1-2 mm thick. A 100 μm sheet of UHMWPE is placed on top of this followed by more hydride powder and the press used again. In this way a layered structure is formed. When the mould is filled to the desired thickness the polyethylene lining the walls is folded flat down and a 500 μm thick sheet of UHMWPE is placed on top and the whole assembly pressed again.

The aluminium mould block is then heated to just above 150° C. and the assembly held at this temperature for up to one hour until the heat has melted the UHMWPE so that it penetrates the porous LBH layers to form a three dimensional network structure. Once the assembly has cooled the pressure is released and the structure removed from the mould.

The whole process needs to be done inside an inert or at least very dry atmosphere. As in the previous embodiment, a further barrier layer is necessary.

In this embodiment a metallized layer is deposited directly onto the outer polyethylene layer using physical vapour deposition to create a 2 to 2.5 μm thick layer of aluminium. To improve the adhesion strength the block is pretreated with a plasma discharge of an argon-oxygen mixture.

In a third embodiment dry powders of UHMWPE and LBH are ground together until the polymer is evenly dispersed in the hydride. A mixture of 4:1 weight ratio of hydride to polymer is used. This mixture is then placed in a mould and pressed using a hydraulic press at pressure up to 0.5 MPa. Whilst still under pressure the mould is then heated to 150° C. and held for more than an hour to allow the polyethylene to melt and bind the hydride into a solid block. This process should be done in an inert or at least dry atmosphere.

As in previous embodiments, a bather layer must be added. This takes the form of a layered material made from polyethylene, aluminized polyester and an outer layer of nylon. This is heat-sealed under vacuum onto the outside of the block.

The fourth specific embodiment involves dissolving ammonium octohydrotriborate and polyvinyl alcohol (PVA) in water to form a viscous lacquer. PVA with a high degree of polymerization (DP=2400-2500) is desirable so that the final material has high mechanical strength but also so that the lacquer or dope has a sufficiently high viscosity even at low concentrations. A 6% solution of PVA (DP=2400-2500 and hydrolysed to 87-89%) to which at least 25% ammonium octohydrotriborate is added would make a suitable lacquer.

This solution can then be degassed and filtered if necessary and then placed into the caster. The caster pumps the solution onto metal belt via a spreader that produces an even layer of the dope across the width of the belt. The solution is then air dried to form a 100-500 μm thick film.

To make a larger thickness these films can be stacked and the whole block pressed and encased in a thin sheet of polyethylene to prevent water ingress.

A fifth specific embodiment used the solution cast technique. The materials used were polyethylene oxide (PEO) and ammonium octohydrotriborate in water. 2M molecular weight PEO at a concentration of around 3% was used, and mixed with the hydride at a concentration of around 12-15%. The mixture was stirred and at the same time heated to 30-40° C. for several hours. Fibres were then produced using a dry spinning process where the viscous solution is forced through a spinneret and then dried using dry hot air and collected on a drum to produce continuous fibres 200-500 μm in diameter.

A sixth specific embodiment uses tetramethyl ammonium borohydride dissolved in water up at 40 wt. %. A block of open cell polyimide foam with an approximate density of 0.007 g/cm$^3$ and millimeter diameter pores is placed in a container which is the same size as the foam block but open at the top. The solution is poured into the top of the foam and agitated to remove bubbles. The container is then gently warmed to 40° C. to drive off the solvent. Once dry, more solution was added and allowed to dry until the foam was filled with the hydride.

Polyimide foams are fire-resistant, thermally stable and have almost no offgassing/outgassing. They provide mechanical stability, but make up a very small proportion of the weight of the composite block.

A barrier layer must be added to keep the hydride from reabsorbing water. This is in the form of a layered material made from polyethylene, aluminized polyester and an outer layer of nylon. This was vacuum and heat sealed onto the outside of the block.

A seventh specific embodiment uses fibres of tetramethyl ammonium borohydride in high molecular weight PEO (4M) as described in embodiment five. These fibres are vacuum dried and layered in mould of the desired shape with each layer having a different fibre orientation. The fibres are gently pressed to create a dense matt. A mesh is then placed over the fibre mat to hold it in place and a solution of 40% tretramethyl ammonium borohydride in water is poured into the mould and the whole assembly agitated to remove bubbles. The assembly is then heated to 40 C to dry the solution. Once dry more of the solution is poured in to the mould agitated and dried until no more solution can be added.

A barrier layer must be added to keep the hydride from reabsorbing water. This is in the form of a layered material made from polyethylene, aluminized polyester and an outer layer of nylon. This was vacuum and heat sealed onto the outside of the block.

The seven techniques described above are examples, and of the numerous variations in the specific materials selected for the polymer and hydride that may be made without departing from the scope of the invention. Furthermore, the moulding and shaping techniques described may be adapted or interchanged to optimise the use of other materials from those described.

Experimental Results

Figure 10:
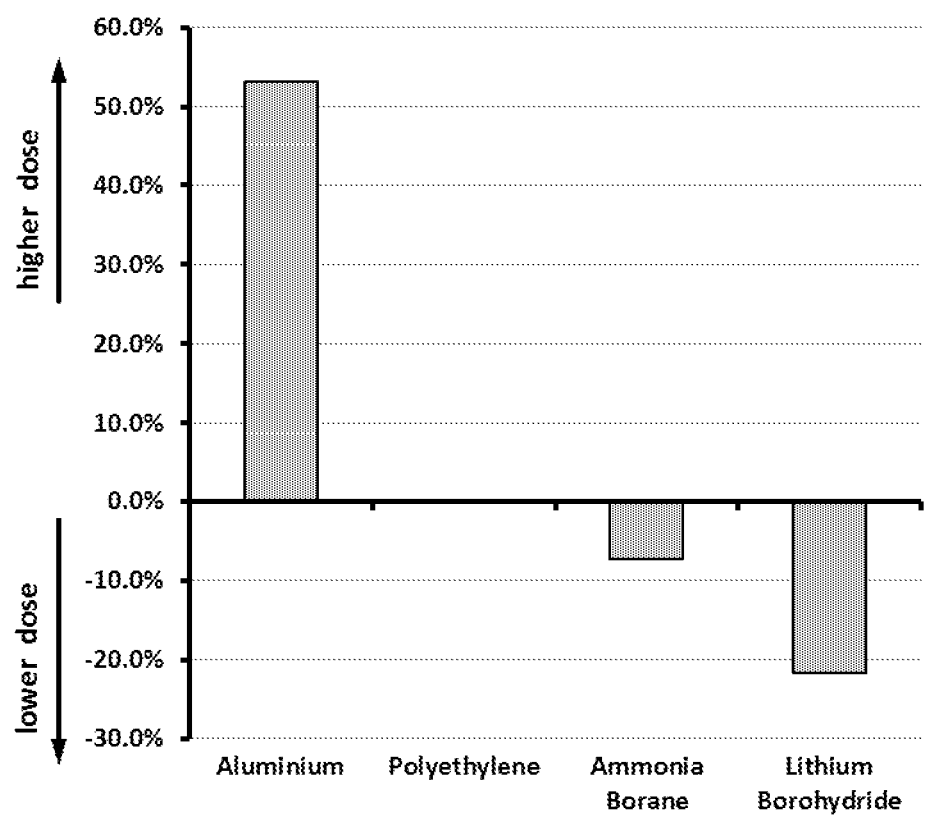
FIG. 10 shows the results of experiments performed at the NASA Space Radiation Laboratory, where a beam of 1.0 GeV/nucleon $^{56}$Fe ions was incident on samples with an areal density of 2.5 gm/cm$^2$. Aluminium, polyethylene and then samples of ammonia borane and lithium borohydride, each encased in 2 mm thick boxes of UHMWPE. The chart shows the change in dose compared to polyethylene.

It is possible to measure the effectiveness of a radiation shielding material using radiation generated using a nuclear accelerator. FIG. 10 shows the results of a measurement done at the NASA Space Radiation Laboratory at Brookhaven National Laboratory, where a beam of 1.0 GeV/nucleon $^{56}$Fe ions was incident on samples with an areal density of 2.5 gm/cm$^2$. Aluminium, polyethylene and then samples of ammonia borane and lithium borohydride, each encased in 2 mm thick boxes of UHMWPE. The chart shows the change in dose compared to polyethylene.

A second experiment was performed using 2.5 GeV protons and 1.0 GeV/nucleon $^{56}$Fe ions. The chosen energies of 2.5 & 56.0 GeV are the peaks of the galactic cosmic ray flux for protons and $^{56}$Fe ions respectively. This is the upper end of the radiation spectrum found in deep space, the kind of radiation that does the larger fraction of the longer term damage to electronics and biological tissue.

The baseline dose due to the heavy $^{56}$Fe ions is attenuated by all shields although it is clear that the hydride/polymer materials are better than the polyethylene or aluminium, as would be expected from their increased hydrogen content. However, the high energy protons show an increase in the measured dose for all materials at this areal density. To understand why this occurs, it is necessary to simulate these experiments.

It is possible to simulate the performance of these materials using particle transport codes such as the GEANT4.0 code developed at the European Centre for Nuclear Research (CERN) and the European Space Agency (ESA). This code models the geometry of the materials of interest and simulates incoming particles, for example electrons, protons, neutrons, gamma rays and heavy ions. Using Monte-Carlo techniques, the code calculates the probability of each of the possible nuclear interactions. It then similarly tracks and calculates interaction probabilities for the daughter products from each interaction.

Figure 11:
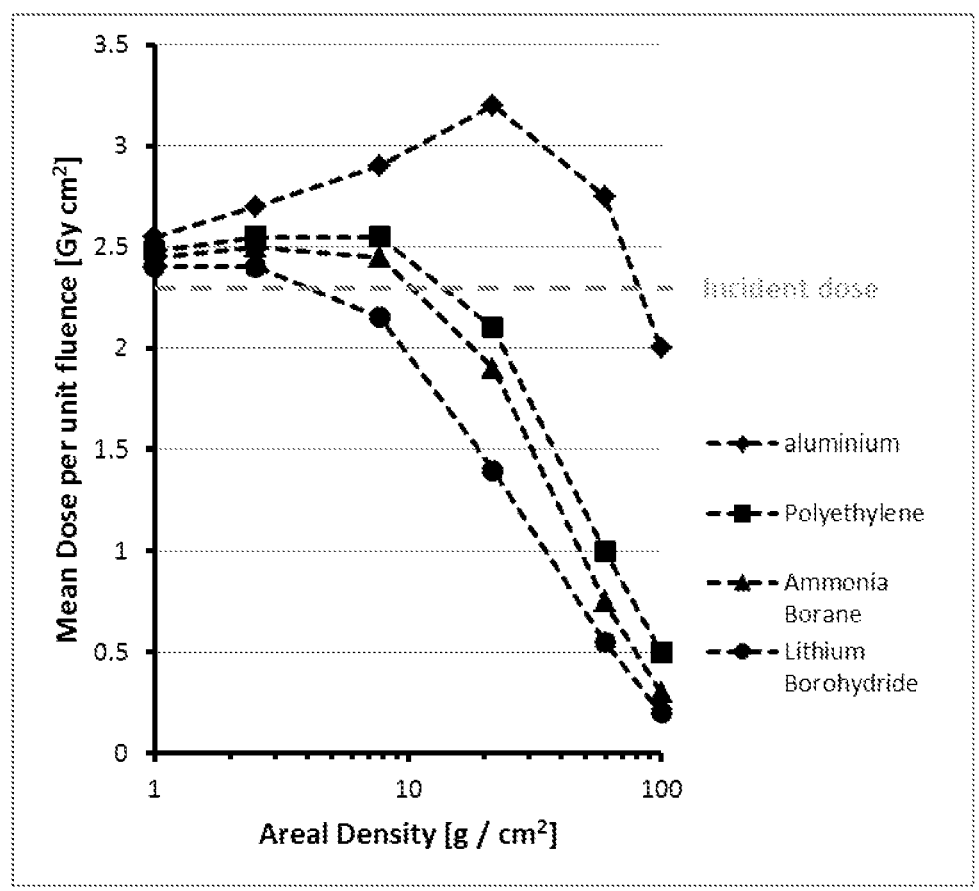
FIG. 11 shows simulations of the dose absorbed in a 0.5 mm thick layer of silicon behind different thicknesses of four different materials that are irradiated by an isotropic flux of 1.0 GeV protons. All the materials show an increase in dose behind the shield compared with the incident dose when the thicknesses are low, but aluminium has by far the worst increase. Lithium borohydride reduces the dose most quickly.

The results of such a simulation can be seen in FIG. 11, where the dose in a 0.5 mm thick layer of silicon behind a shield is shown as a function of increasing areal density for each of the four shield materials. The material are irradiated by an isotropic flux of 1.0 GeV protons. All the materials show an increase in dose behind the shield compared with the incident dose when the thicknesses are low, but aluminium has by far the worst increase. Lithium borohydride reduces the dose most quickly.

The experiments using protons show that the dose in the silicon increases for all materials when the shield is thin. In aluminium this is due to nuclear fragmentation, but in the hydrogen-containing materials it is due to proton recoil. As the shield thickness increases, the dose drops most rapidly for the hydride-containing materials and least rapidly for aluminium.

Incorporation into Spacecraft or Spacesuit

Figure 8:
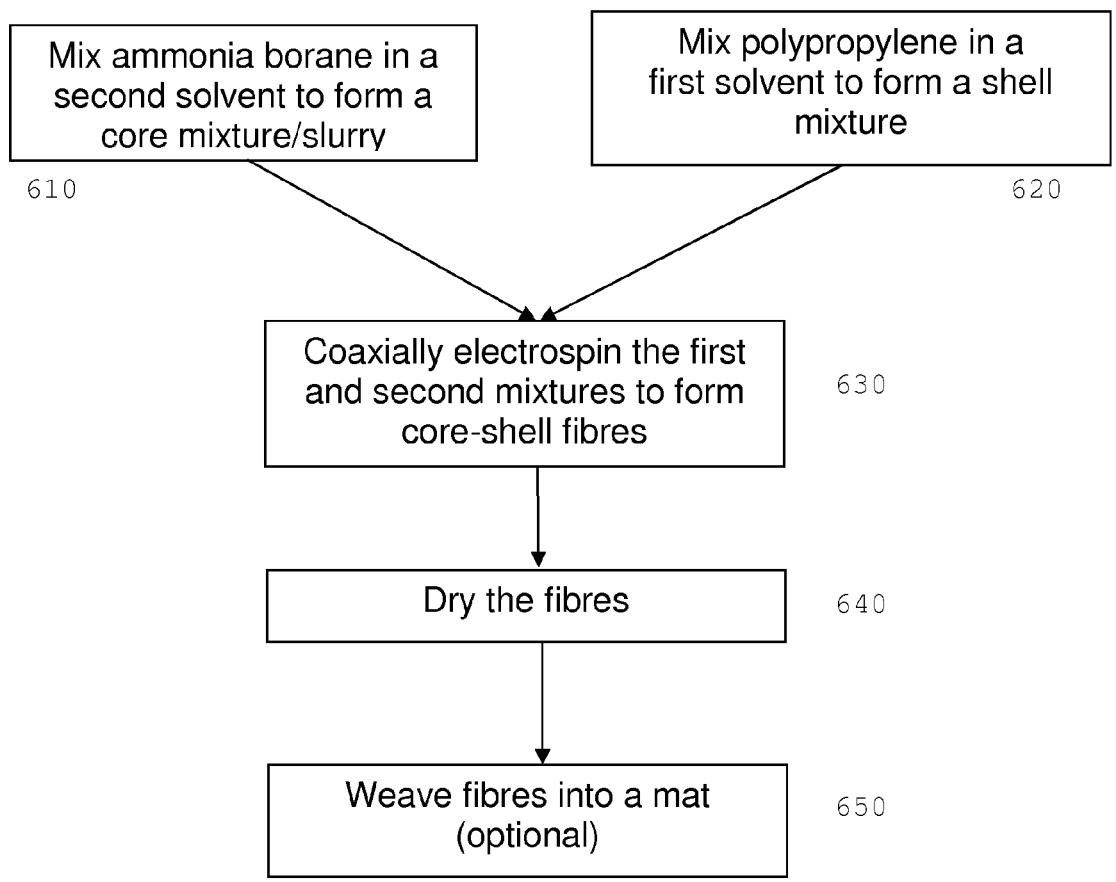
FIG. 8 is a flow chart showing steps in manufacturing a material for a spacecraft shield according to a fifth specific embodiment using coaxial electrospinning.
Figure 9:
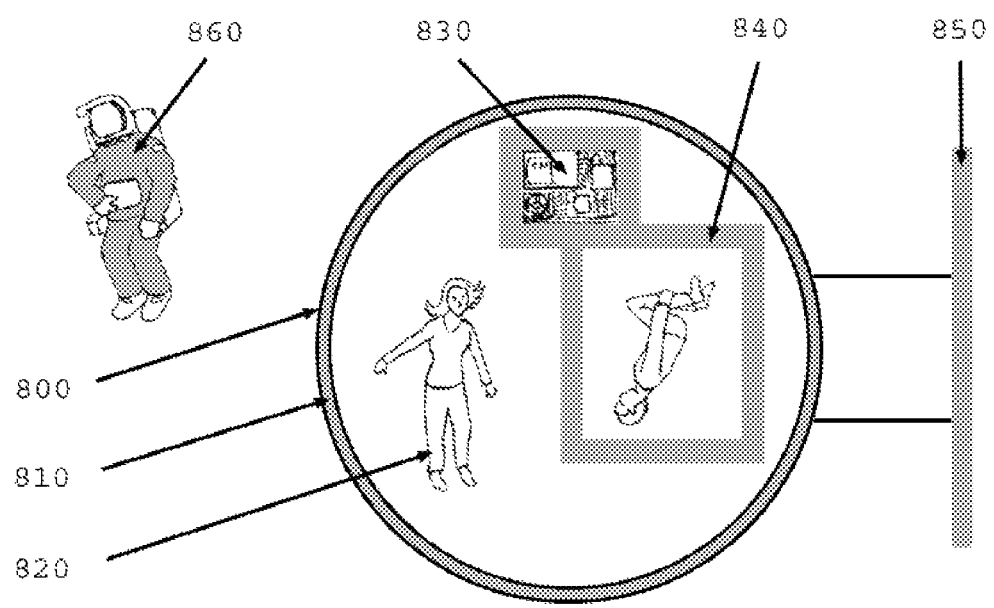
FIG. 9 is a schematic diagram of a spacecraft with shielding.

After the shield material has been prepared the material is incorporated into a spacecraft for example in the manner shown in FIG. 8. The spacecraft 800 includes a region which can be occupied by humans 820 and also in which sensitive electronics 830 are housed. It is therefore required that this region be shielded from space radiation. A shield 810 is formed in the hull of the spacecraft to reduce the exposure of humans 820 to the radiation and also prevent degradation of the electronics 830 by the radiation. Part or all of the electronics 830 may also be provided with an extra layer of shielding to provide further radiation protection. Furthermore, the spacecraft may also have additional components that require shielding from radiation. For example, the spacecraft may include a "storm shelter" 840 inside the spacecraft. This would provide human occupants with a region of increased radiation protection such as may be useful in times of peak solar activity. The storm shelter would be exposed to air within the spacecraft and if a neutron absorbing element is present in the shield, the storm shelter would also protect against secondary radiation (nuclear fragmentation) from the hull. Additional components may be fitted to the outside of the spacecraft. Alternatively, because of the orientation of the spacecraft and the contents it carries it may only be necessary to shield one side of the spacecraft, namely that facing away from the earth and/or towards the sun. In such cases a shield 850 mounted externally from the spacecraft may be used. If the shield is manufactured from fibres or sheet-based materials described above, the shield may be folded up during launch and deployed after the spacecraft has reached the correct orbit. Furthermore, the flexibility of fibre-based materials makes them particularly useful for spacesuits and inflatable structures. Shield materials that are flexible may also be used in spacesuit 860.

The shield may be incorporated into or comprise a structural member or impact shield, for example a micrometeorite shield.

As well as using the bulk, film, fibre or mat-based shield materials individually it is also possible to combine the three types of materials. For example, in a given area a mixture of materials may be used to produce optimum shield packing in enclosed or complex spaces by using a mixture of bulk and film or fibre shield materials. The materials described herein for use in spacecraft and spacesuits may also be used in other space objects in which radiation shielding is required, for example lunar or planetary habitation modules.

The invention claimed is:

1. A radiation shield characterised by comprising a hydride and a thermoplastic or thermosetting polymer binder wherein the radiation shield comprises greater than 14.4 wt % hydrogen.

2. A radiation shield as claimed in claim 1 characterised in that the hydride is selected from one or more of ammonia borane, ammonium borohydride, methylammonium borohydride, an ammoniate of lithium borohydride, a methyl amine borane, ammonia triborane, ammonium octahydrotriborane, lithium borohydride and beryllium hydride.

3. A radiation shield as claimed in claim 1 characterised in that the polymer binder is one or more of polyethylene, polypropylene, polyisobutylene, polybutadiene, poly(methyl methacrylate), polysulphone, polystyrene, poly(vinyl pyrrolidone), poly(vinylidene fluoride), poly(tetrafluoromethylene), polyethylene oxide, poly(vinyl acetate), polyester, a co-polymer comprising two or more polymers, polyepoxide, polyimide, polyamide, polyaramide and melamine formaldehyde.

4. A radiation shield as claimed in claim 1 characterised in that the polymer binder is one or more of polyethylene, polypropylene, poly(4-methyl-1-pente), nylon6,6, poly(vinyl alcohol) and poly(oxymethylene).

5. A radiation shield as claimed in claim 1 characterised in that the hydride has a hydrogen content in the range 14 to 25 wt %.

6. A radiation shield as claimed in claim 1 characterised in that it is prepared by polymerising a monomer corresponding to the polymer binder in the presence of the hydride and a polymerisation catalyst.

7. A radiation shield as claimed in claim 1 characterised in that it is prepared by mixing the polymer binder and the hydride before moulding.

8. A radiation shield as claimed in claim 6 characterised in that preparation is carried out in the presence of a solvent.

9. A radiation shield as claimed in claim 1 characterised by comprising a composite of alternating layers of polymer binder and hydride.

10. A radiation shield as claimed in claim 1 characterised by comprising a flexible film of the polymer binder and hydride.

11. A radiation shield as claimed in claim 1 characterised by a mat of fibres comprising the polymer binder and the hydride.

12. A radiation shield as claimed in claim 1 characterised by comprising the hydride held in the pores of a foam of the polymer binder.

13. A radiation shield as claimed in claim 1 characterised by comprising a solid block prepared by sintering a mixture of the thermoplastic polymer binder and the hydride at high pressures and high temperatures.

14. A radiation shield as claimed in claim 1 characterised by comprising a mixture of the hydride and polymer binder in a polymer box.

15. A radiation shield as claimed in claim 1 characterised in that the hydride does not melt or release hydrogen at temperatures below 100° C.

16. A radiation shield as claimed in claim 1 characterised by further comprising a polymer layer or metallised polymer layer, said layer being gas impermeable and enveloping the hydride.

17. A radiation shield as claimed in claim 1 characterised in that the radiation shield comprises a neutron absorber, wherein the neutron absorber is one or more of lithium isotopically enriched with lithium-6 and boron isotopically enriched with boron-10.

* * * * *